UNITED STATES PATENT OFFICE 2,064,944

PYRIDINE DERIVATIVES AND PROCESS OF MAKING THEM

Joachim Reitmann, and Gerhard Hecht, Wuppertal-Elberfeld, Germany, assignors to Winthrop Chemical Company Inc., New York, N. Y., a corporation of New York No Drawing. Application December 16, 1931, Serial No. 581,509. In Germany December 20, 1930

24 Claims. (Cl. 260—42)

The present invention relates to halogenated 4-pyridones which are valuable for the use in X-ray photography, more particularly it relates to 4-pyridones of the formula:

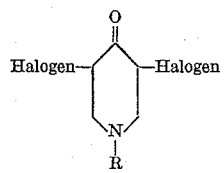

wherein halogen stands for bromine or iodine and R stands for an aliphatic radical which may bear substituents. The invention further relates to a process of preparing the said new compounds.

It is known that compounds containing iodine have in some cases proved to be suitable for use as contrast agents, which are of importance in the X-ray photography of organs, particularly of the urinary passages.

Efforts are being made by raising the iodine concentration to obtain a deepening of the X-ray shadow. With this object in view 2-pyridones of high iodine content have already been produced. Such compounds, however, do not display any advantages when applied as X-ray contrast agents compared with the mono-iodine substituted 2-pyridones, since the introduction of a second iodine atom considerably decreases the solubility with the result that intravenous administration has been found to be impossible.

In accordance with the present invention contrast agents of high bromine or iodine content and of a considerably greater solubility in water than the known halogenated 2-pyridones are obtainable when 4-pyridone is transformed by brominating or iodizing into the 3.5-dibromo- or 3.5-diiodo-4-pyridone and the latter are caused to react with a halogenated aliphatic compound capable of conferring solubility in water to form the corresponding N-alkyl derivatives of the dihalogenated 4-pyridones specified. Simple saturated and unsaturated alkyl radicals and such substitution products thereof as contain halogen, hydroxy, carboxylic-and sulfonic acid and acid amide groups, amino and alkylamino groups as substituent have proven satisfactory and, therefore, are equivalent for our present invention as aliphatic radicals conferring water-solubility to dihalogenated 4-pyridones, and will be understood as such groups in the appended claims.

In accordance with our invention the process of manufacture of our new N-substituted 3.5-dibromo or 3.5-diiodo-4-pyridones proceeds by reacting upon the alkali metal salts of the dihalogen-4-pyridones specified with the halogenated aliphatic compound in accordance with the following equation:

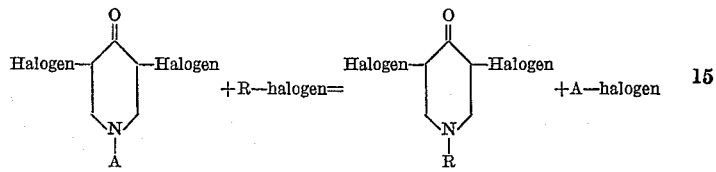

wherein halogen stands for bromine or iodine, A stands for an alkali metal and R stands for an aliphatic radical. According to these directions there may be used as halogenated aliphatic compounds, for example, alkyl halides, such as methyl, ethyl and propyl halides, allyl and crotyl bromide, furthermore halogenated acetic, propionic, butyric acid and their amides, halogen alkyl sulfonic acids, such as iodomethane-, iodoethane and bromo-propane sulfonic acid and their amides, but also alkylaminoalkyl halides, such as dimethylaminoethyl-and-ethyl chloride, diethylaminoethyl chloride or bromide, alpha-diethylaminopentyl-delta-chloride or bromide, and the like may be employed. When using primary or secondary aminoalkyl halides these are to be employed advantageously in the form of their acyl derivatives, such as acetyl or benzoyl derivatives, for example, of amino- or ethylaminomethyl or ethyl halides and the like.

Our new process is advantageously performed by dissolving one mol. of the 3.5-dibromo-or diiodo-4-pyridone in a dilute aqueous solution of an alkali metal hydroxide, adding at least one mol. of the halogenated aliphatic compound of an alkali metal or ammonium salt thereof respectively and heating the mixture on the water-bath or to boiling. In general after a short time, for instance, one hour, the reaction is complete. The reaction is advantageously performed in the presence of a solvent being inert to the starting materials, preferably in the presence of water, but also other solvents, for instance, methyl and ethyl alcohol, may be employed. However, in some cases the use of a solvent is superfluous. In such cases the alkali metal salts of the 3.5-dibromo-or diiodo-4-pyridone are used in the dry state. An excess of the halogenated aliphatic compound should then be employed. The separation of the reaction product depends on the kind of the aliphatic radical introduced into the pyridone-molecule. The N-alkyl, halogen-, hydroxy- and aminoalkyl-derivatives, in general, precipitate from the solution and may be separated in the usual manner, for instance, by vacuum filtration. They are purified by recrystallizing. The N-alkyl carboxylic- or sulfuric acid derivatives are separated from the solution by salting out, for instance, by means of sodium chloride or hyrdoxide or potassium carbonate. The free acids may be obtained from their salts by precipitating by means of mineral acids from their concentrated aqueous solution.

Our new products are whitish powders, which display an increased solubility in water when compared with 3.5-dibromo- or 3.5-diiodo-4-pyridone or with the corresponding N-alkylated derivatives of 2-pyridone. Those N-substituted derivatives of the 4-pyridones specified which are capable of forming salts owing to a content of an acid or basic group yield salts preferably either with alkali metal or ammonium hydroxide, or with mineral or the lower aliphatic acids, respectively, which salts are readily soluble in water and therefore may be used with advantage for X-ray photography especially for intravenous injection in pyelography. The amino-alkylated 4-pyridones specified are also in the form of their quaternary salts readily soluble in water and adapted for the above indicated purposes.

We prefer to use for the said purposes the salts of 3.5-diiodo-4-pyridones which are substituted by alpihatic carboxylic acids, especially acetic acid, by alkyl sulfonic acids, especially ethane sulfonic acid and by dialkylaminoalkyl radicals, especially the diethylaminoethyl radical or the quaternary salts thereof.

The invention is further illustrated by the following examples without being restricted thereto:

*Example 1.*—74 grams of the sodium salt of 3.5-diiodo-4-pyridone are dissolved in 200 ccs. of water and heated to boiling for 2 hours with a solution of 57 grams of chloroacetic acid in 600 ccs. of normal caustic soda. After cooling hydrochloric acid is added to the reaction liquid and the acid precipitated is purified by dissolving in sodium carbonate solution and reprecipitating. It melts at 246° C. with decomposition. To obtain the sodium salt it is dissolved in the calculated quantity of normal caustic soda and evaporated. The yield amounts to about 70–80 grams. The sodium salt of 3.5-diiodo-4-pyridone-N-acetic acid (containing 60% of iodine) thus obtainable dissolves to the extent of 33.6 parts in 100 parts of water, which corresponds to an iodine content of 22 parts. Compared with this the corresponding mono-iodinated compound of 2-pyridone, possessing an iodine content of 42% and which dissolves in cold water to the extent of 35 parts enables only 14 parts of iodine to be brought into solution.

When using instead of chloro acetic acid other halogenated aliphatic carboxylic acids, for example, beta-bromo-propionic acid, or gamma-bromo-butyric acid the propionic and butyric acid derivatives of 3.5-diiodo-4-pyridone are obtained. They are whitish substances the solubility in water whereof decreases with an increasing alkyl radical of the aliphatic acid radical.

In the production of X-ray photographs of the urinary passages of a dog it was found, for example, that when 10 grams of the sodium salt of 3.5-diiodo-4-pyridone-N-acetic acid were administered intravenously to a dog weighing 26 kgs. the urine of the animal from the first to the fifth hour after the injection contains 5.26% of organically combined iodine as compared, for example, with the maximum content of about 2.5% after administration of the corresponding mono-iodo-alpha-pyridone compound. It follows that the contrast effect obtained in the X-ray photograph is approximately twice as strong with the result that very satisfactory X-ray photographs of the urinary passages can be produced in this manner.

*Example 2.*—Into a solution of 34.7 grams of 3.5-diiodo-4-pyridone in 110 ccs. of normal caustic soda 40 grams of diethylaminoethylchloride are dropped in while heating the solution to boiling. After the reaction has been finished, the mixture is cooled, the oily product resulting from the reaction settled at the bottom is separated and recrystallized from a small quantity of acetone. The N-diethylaminoethyl-3.5-diiodo-4-pyridone thus obtained forms whitish crystals melting at 85° C. and is readily soluble in acids and organic solvents, excluding ether.

In an analogous manner the 3.5-diiodo-4-pyridone-N-dimethylaminomethyl- or ethyl, N-diethylaminomethyl or propyl derivatives may be prepared by starting with the corresponding dialkylaminoalkylhalides. N-amino- or ethylaminoethyl derivatives are obtained when using, for instance, the acetyl derivatives of the corresponding amino- or mono-alkylaminoethylhalides and splitting off subsequently the acyl group from the acetyl derivative formed.

In order to transform the N-diethylaminoethyl-3.5-diiodo-4-pyridone into the corresponding quaternary compound to a solution of 8.7 grams of the said pyridone in 10 ccs. of benzene 3 grams of dimethylsulfate are added while heating to boiling, whereby under self-heating of the solution the corresponding quaternary methylsulfate precipitates. After decanting off the benzene the reaction product is digested with hot alcohol, sucked off and washed with alcohol. It is a white powder, melting at 215° C. while decomposing and is readily soluble in water.

*Example 3.*—8.7 grams of 3.5-diiodo-4-pyridone are dissolved in 26 ccs. of normal caustic soda solution on the water-bath and the solution is heated for 4 hours on the water-bath with a hot solution of 5 grams of chloroacetamide in 30 ccs. of water. After cooling the 3.5-diiodo-4-pyridone-N-acetamide separates in a crystalline form. When recrystallized from water the melting point is at 275° C.

The N-methyl-3.5-diiodo-4-pyridone prepared in an analogous manner by means of methyl iodide or dimethyl sulfate has the melting point 207° C.

*Example 4.*—34.7 grams of 3.5-diiodo-4-pyridone are dissolved in 110 ccs. of normal caustic soda solution on the water-bath and 15 grams of mono-chlorohydrine are added to the solution. After several hours standing on the water-bath a thick crystal magna separates, which is sucked off and recrystallized from dilute hydrochloric acid after treatment with normal caustic soda. The N-(beta-gamma-dihydroxypropyl)-3.5-diiodo-4-pyridone obtained melts at 161° C.

*Example 5.*—By reacting with an excess of chloroethyl alcohol upon the sodium salt of 3.5- diiodo-4-pyridone the latter is converted into the N-(beta-hydroxyethyl)-3.5-diiodo-4-pyridone of the melting point 260° C. The latter may be transformed into N-(beta-chloroethyl)-3.5-diiodo-4-pyridone of the melting point 180° C. by the action of thionylchloride. 3.5-diiodo-4-pyridone-N-ethane sulfonic acid or its salts are obtainable when boiling, for instance, 12 grams of sodium sulfite in 60 ccs. of water with 16.5 grams of the said N-(beta-chloroethyl)-3.5-diiodo-4-pyridone for 10 hours under reflux. In order to obtain the reaction product, the mixture is acidified with hydrochloric acid, filtered, the filtrate is rendered strongly alkaline, the crystal magma formed is sucked off and the sodium salt thus obtained is recrystallized from dilute alcohol. On heating above 250° C. its color becomes slowly dark and at 300° C. it is not yet melted. The free acid obtained by acidifying the sodium salt is, same as the sodium salt, a white powder and readily soluble in water. The barium salt is difficultly soluble, the potassium salt is readily obtained from the aqueous solution of the acid by salting out by means of potassium carbonate.

The same 3.5-diiodo-4-pyridone-N-ethanesulfonic acid is obtained when employing instead of the N-ethylchloride the 3.5-diiodo-4-pyridone-N-ethyl-bromide (melting point 189° C.), obtained by reacting with ethylenebromide upon 3.5-diiodo-4-pyridone, for the reaction with sodium sulfite. It is also possible to convert the sodium salt of the 3.5-diiodo-4-pyridone directly with beta-chloroethane sulfonic acid or the sodium salt thereof.

When using instead of beta-chloroethane sulfonic acid, for example, the sodium salt of iodomethane sulfonic acid, the 3.5-diiodo-4-pyridone-N-methane-sulfonic acid, the sodium salt respectively is obtained.

Example 6.—34.7 grams of 3.5-diiodo-4-pyridone are dissolved in 110 ccs. of normal caustic soda solution while heating and at 100° C. 20 grams of allyl bromide are dropped into the solution. The reaction product is sucked off after cooling, washed first with normal caustic soda solution and then with water. On recrystallization from alcohol it has the melting point 171–172° C.

Example 7.—25.3 grams of 3.5-dibromo-4-pyridone, prepared by brominating 4-pyridone or its salts in aqueous solution, are dissolved in 110 ccs. of normal caustic soda solution while heating and treated with a solution of 19 grams of monochloroacetic acid in 100 ccs. of 2-normal caustic soda and heated on the water-bath for 3 hours. The solution is then treated with potassium carbonate, the potassium salt precipitating is sucked off, dissolved in water, the solution is filtered and the 3.5-dibromo-4-pyridone-N-acetic acid precipitated by means of hydrochloric acid. It melts at 261° C. while decomposing.

While we have described our improvements in great detail and with respect to preferred embodiments thereof, we do not desire to limit ourselves to such details or embodiments, since many modifications and changes may be made and the invention embodied in widely different forms without departing from the spirit or scope of the invention in its broadest aspects. Hence we desire to cover all modifications and forms within the scope or language of any one or more of the appended claims.

We claim:—

1. 4-pyridones of the formula:

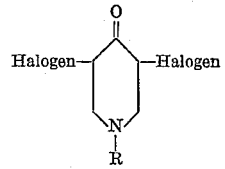

wherein halogen stands for a substituent selected from the group consisting of bromine and iodine, and R stands for an aliphatic group which products are in general whitish powders, being characterized by an increased solubility in water, being valuable products for the X-ray photography.

2. 4-pyridones of the formula:

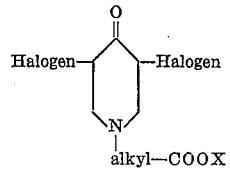

wherein halogen stands for a substituent selected from the group consisting of bromine and iodine and X stands for a member of the group consisting of hydrogen, alkali metal, and ammonium which products are in general whitish powders, being characterized by an increased solubility in water, being in the form of their alkali-metal and ammonium salts useful as contrast media for X-ray photography.

3. 3.5-diiodo-4-pyridones of the formula:

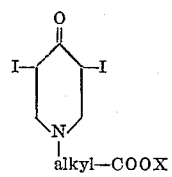

wherein X stands for a member of the group consisting of hydrogen, alkali, metal, and ammonium, which products are white crystalline substances, being characterized by an increased solubility in water, being in the form of their alkali metal and ammonium salts useful as contrast media for X-ray photography.

4. The 3.5-diiodo-4-pyridones of the formula:

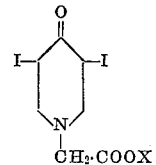

in which X stands for a member of the group consisting of hydrogen, alkali metal, and ammonium which product forms in the form of the free acid crystals melting at 246° C., and is in the form of its alkali metal or ammonium salts useful as a contrast medium for X-ray photography.

5. 4-pyridones of the formula:

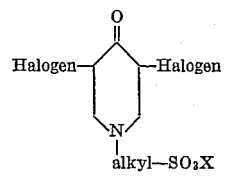

wherein halogen stands for a substituent selected from the group consisting of bromine and iodine and X stands for a member of the group consisting of hydrogen, alkali, metal, and ammonium which products are whitish powders, being characterized by an increased solubility in water, being in the form of their alkali metal or ammonium salts useful as contrast media for X-ray photography.

6. The 3.5-diiodo-4-pyridone-N-ethane-ω-sulfonic acid of the formula:

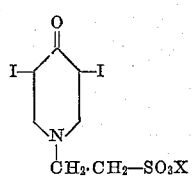

in which X stands for a member of the group consisting of hydrogen, alkali metal, and ammonium, which product is a white powder, being readily soluble in water, being in the form of its alkali metal or ammonium salts useful as contrast medium for X-ray photography.

7. 4-pyridones of the formula:

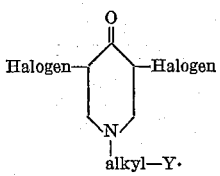

wherein halogen stands for a substituent selected from the group consisting of bromine and iodine and Y stands for a member of the group consisting of amino, alkylamino and an aliphatic quaternary ammonium-hydroxyl radical, which products are whitish substances, being in the form of their salts with mineral or the lower aliphatic acids or in the form of the quaternary salts readily soluble in water and useful as contrast media for X-ray photography.

8. 4-pyridones of the formula:

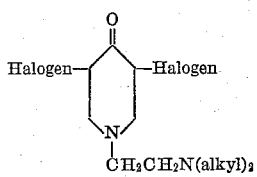

wherein halogen stands for a substituent selected from the group consisting of bromine and iodine, which products may be present in the form of their salt with a mineral or lower aliphatic acid, and which are whitish substances, being in the form of their salts with mineral or the lower aliphatic acids or in the form of the quaternary salts readily soluble in water and useful as contrast media for X-ray photography.

9. The 3.5-diiodo-4-pyridone of the formula:

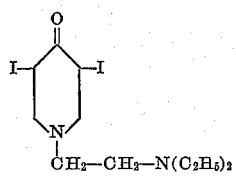

forming whitish crystals melting at 85° C., forming as quaternary methyl sulfate compound a white readily water-soluble powder melting at 215° C. while decomposing, being in the form of its water-soluble salts with mineral and the lower aliphatic acids and in the form of its quaternary salts useful as contrast agent for X-ray photography.

10. The process which comprises reacting upon a 4-pyridone of the formula:

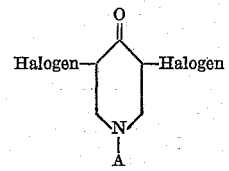

wherein A stands for an alkali metal and halogen stands for a substituent selected from the group consisting of bromine and iodine, with a halogenated aliphatic compound while heating.

11. The process which comprises reacting upon a 4-pyridone of the formula:

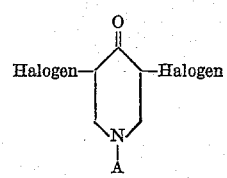

wherein A stands for an alkali metal and halogen stands for a substituent selected from the group consisting of bromine and iodine, with an alkali metal salt of halogen alkyl-carboxylic acid in the presence of a solvent being inert to the starting materials while heating.

12. The process which comprises reacting upon a 4-pyridone of the formula:

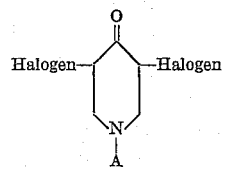

wherein A stands for an alkali metal and halogen stands for a substituent selected from the group consisting of bromine and iodine, with an alkali metal salt of a halogen acetic acid in aqueous solution while heating.

13. The process which comprises reacting upon one mol. of an alkali metal salt of 3.5-diiodo-4-pyridone with about one mol. of an alkali metal salt of the chloroacetic acid in aqueous solution while heating.

14. The process which comprises reacting upon a 4-pyridone of the formula:

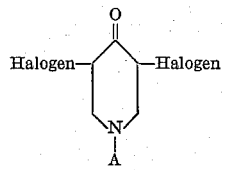

wherein A stands for an alkali metal and halogen stands for a substituent selected from the group consisting of bromine and iodine with a hydroxyalkyl halide while heating, transforming the N-hydroxyalkyl derivative formed into the corresponding N-chloroalkyl derivative by the action of thionylchloride and reacting upon the N-chloroalkyl derivative with alkali sulfite in the presence of water while heating to boiling.

15. The process which comprises reacting upon a compound of the formula:

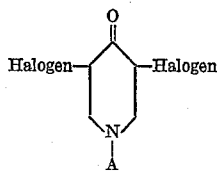

wherein A stands for an alkali metal and halogen stands for a substituent selected from the group consisting of bromine and iodine, with chloroethyl alcohol while heating, transforming the N-hydroxyethyl derivative formed into the corresponding N-chloroethyl derivative by the action of thionyl chloride and reacting upon the N-chloroethyl derivative with alkali sulfite in the presence of water while heating to boiling.

16. The process which comprises reacting upon the sodium salt of 3.5-diiodo-4-pyridone with an excess of chloroethyl alcohol while heating, transforming the N-hydroxyethyl derivative formed into the corresponding N-chloroethyl derivative by the action of thionylchloride and reacting upon the N-chloroethyl derivative with sodium sulfite in the presence of water while heating to boiling.

17. The process which comprises reacting upon a compound of the formula:

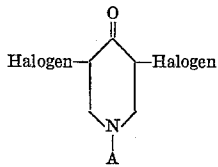

wherein A stands for an alkali metal and halogen stands for a substituent selected from the group consisting of bromine and iodine, with an amino alkyl halide of the group consisting of acetylamino alkyl halide, benzoyl amino alkyl halides, and alkyl amino alkyl halides in the presence of a solvent being inert to the starting materials while heating.

18. The process which comprises reacting upon a compound of the formula:

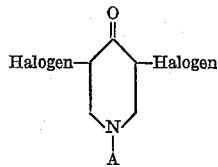

wherein A stands for an alkali metal and halogen stands for a substituent selected from the group consisting of bromine and iodine, with an amino ethyl halide of the group consisting of acetylamino ethyl halides, benzoyl amino ethyl halides and alkyl amino ethyl halides in the presence of a solvent being inert to the starting materials while heating.

19. The process which comprises reacting upon a compound of the formula:

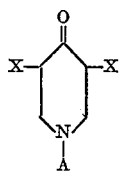

wherein A stands for an alkali metal and X stands for a substituent selected from the group consisting of bromine and iodine, with diethylamino-ethylchloride in an aqueous solution while heating to boiling.

20. The process which comprises reacting upon one mol. of an alkali metal salt of 3.5-diiodo-4-pyridone with about one mol. of diethylaminoethylchloride in aqueous solution while heating to boiling.

21. The process which comprises reacting upon a halogen 4-pyridone of the formula:

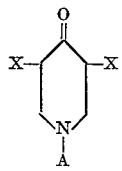

wherein X stands for a substituent selected from the group consisting of bromine and iodine and A stands for an alkali metal with an amino ethyl halide of the group consisting of acetylamino ethyl halides, benzoyl-amino ethyl halides and alkylamino ethyl halides while heating.

22. Halogenated 4-pyridones having the formula:

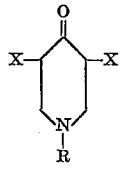

wherein X stands for a substituent selected from the group consisting of bromine and iodine and R stands for an aliphatic radical.

23. The sodium salt of 3,5-diiodo-4-pyridone N-acetic acid.

24. Halogenated 4-pyridones having the formula:

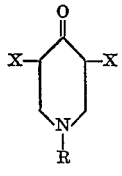

wherein X stands for a substituent selected from the group consisting of bromine and iodine and R stands for an aliphatic radical containing an acid group.

JOACHIM REITMANN.
GERHARD HECHT.